3,335,120
PURIFICATION OF SOLVENT FOR OLEFIN POLYMERIZATION
Hugh J. Hagemeyer, Jr., and Marvin B. Edwards, Longview, Tex., assignors to Eastman Kodak Company, Rochester, N.Y., a corporation of New Jersey
No Drawing. Filed Apr. 1, 1960, Ser. No. 19,181
7 Claims. (Cl. 260—93.7)

This invention relates to an improved process for the polymerization of α-olefinic hydrocarbons to solid polymer. In a specific aspect, this invention relates to an improved process for the purification of solvent that is employed in the catalytic polymerization of ethylene, propylene and homologs thereof to solid crystalline polymer. In a more specific aspect, this invention relates to a two-step procedure for the purification of hydrocarbon solvent that is recycled to a catalyst polymerization process for the preparation of polyethylene and polypropylene.

This application is a continuation-in-part of our co-pending application Ser. No. 3,724, filed Jan. 21, 1960 now Patent No. 3,153,027.

It is well known in the art that α-olefinic hydrocarbons, such as ethylene and propyene, can be polymerized to form solid polymers. The reaction is usually conducted in the presence of a catalyst and a number of well-known catalysts have been employed in such a polymerization reaction. For example, it is known that oxygen and peroxy type catalysts are effective for producing polyethylene having certain specific properties. It is also known that ionic catalysts can be used in low pressure procedures for the polymerization of ethylene to solid, high-density polymers. Among the catalysts that have been used in these procedures are organo-aluminum compounds, such as triethyl aluminum, diethyl aluminum chloride, ethyl aluminum sesquichloride and the like in admixture with transition metal compounds, such as titanium tetrachloride and titanium trichloride. Metal oxide catalysts have also been used for the low pressure polymerization of ethylene. For example, molybdenum oxide and chromium oxide have been used alone or in admixture with other metal oxides, and in some instances on support materials, such as alumina, silica and the like, for such polymerization reactions.

Frequently, the catalytic polymerization of ethylene, propylene and other α-olefinic hydrocarbons is carried out in the presence of an inert liquid organic solvent for the process. It is recognized that the use of such inert solvents is advantageous in these polymerization reactions since the reactions are quite exothermic and solvents offer an efficient expedient for ready temperature control. It has also been recognized that the solvent employed in the process must be substantially free of poisons, such as water, carbon dioxide and the like, and in order to free the solvent of such poisons the solvent has been treated by various means, such as distillation, reaction with acidic compounds, and the like.

In commercial operation, it is usually desirable to carry out the olefinic hydrocarbon polymerization reaction in a process wherein the solvent is separated from the high molecular weight polymer, and the recovered solvent is then recycled to the polymerization reactor for further preparation of polymer. Solvent that is recycled in this manner has been found to accumulate substantial quantities of impurities that are formed during the polymerization reaction. These impurities usually lead to a subtsantial decrease in the rate of polymerization, and in some instances, uneconomically large quantities of catalyst are required in order to maintain an efficient rate of polymerization. The presence of the impurities also tends to cause discoloration of the polymer and to lead to an undesirably high ash content of the polymer.

The impurities that are introduced to the solvent during the polymerization reaction appear to be quite different from the impurities that have in the past been removed from the fresh solvent feed for the process. Such procedures as distillation and reaction with acidic reactants which are effective for removing contaminants from the fresh solvent feed for the process are substantially ineffective for purifying recycle solvent for the polymerization reaction.

In our copending application Serial No. 3,724, filed Jan. 21, 1960, we have disclosed a process for the purification of recycle or fresh solvent that is employed in an olefinic hydrocarbon polymerization process wherein a metal oxide is employed primarily as the polymerization catalyst. In such a process, it appears that during the polymerization reaction the metal oxide catalyst tends to form carbonyl-containing impurities and as the solvent is re-used in the process the accumulation of carbonyl-containing impurities in the solvent tends to have an adverse effect upon the rate of polymerization and upon the color and dash content of the polymer. We have found that in olefinic hydrocarbon polymerization reactions wherein normally liquid hydrocarbon solvents are employed as a diluent and wherein catalysts other than the metal oxide catalysts are employed an undesirable accumulation of impurities occurs. The impurities appear to be formed during the polymerization reaction, and although the impurities may not be of the carbonyl-containing type, they have adverse effects upon the polymerization reaction.

It is an object of this invention to provide a novel process for the polymerization of α-olefinic hydrocarbons wherein the polymerization reaction is carried out in an inert liquid solvent medium. It is another object of this invention to provide a novel process for the removal of impurities from hydrocarbon solvents for use in the polymerization of α-olefinic hydrocarbons. It is a further object of this invention to provide a novel process for the polymerization of ethylene to solid polymer wherein a novel procedure is employed for the purification of solvent for the reaction, and as a consequence, the rate of polymerization is maintained at a relatively high level, and the color and ash content of the polymer is maintained at a minimum. Further and additional objects of this invention will be apparent from the detailed disclosure.

In accordance with our invention, it has been found that impurities can be removed from the fresh solvent feed and from recycle solvent for an α-olefinic hydrocarbon polymerization process by a procedure that involves refluxing and distilling the solvent containing the impurities with a basic compound selected from the group consisting of the hydroxides and lower alkoxides of alkali metals and passing resulting distillate through a bed of silica gel particles. Each step of our purification process is essential although the impure solvent can have impurities removed by employing either step of our process alone. Thus, either step of our process could be employed to effect a substantial reduction in the amount of impurities contained in our recycle solvent. However, we have found that by employing the specific combination of steps in our purification system we are able to obtain a greater removal of impurities from our recycle solvent than one would expect to obtain from the results observed by using the individual purification steps of our process alone. This fact is demonstrated by the data in our examples and particularly the data in Example 1.

Our recycle solvent purification process can be used in processes that lead to the production of ethylene homopolymers, propylene homopolymers and ethylene-propylene copolymers of widely varying molecular weights and physical properties. Thus, the process in which our invention is employed can be used to form relatively low molecular weight grease-like homopolymers of ethylene. The invention can also be employed in a process for preparing wax-like and rubber-like polymers of ethylene as well as in the preparation of tough, solid, high molecular weight ethylene polymers. Our invention can also be employed in procedures for the preparation of a wide variety of propylene polymers and ethylene-propylene copolymers. Other polymerizable olefins that can be employed in our process include the α-olefinic hydrocarbons containing up to ten carbon atoms, such as 1-butene, 1-hexene, 1-octene, and 1-decene. These olefinic hydrocarbons can be polymerized either alone or in copolymerization reactions with other polymerizable hydrocarbons.

In practicing our invention, any of the catalysts other than metal oxides that are known to polymerize olefinic hydrocarbons, such as ethylene and propylene, to high molecular weight polymers can be used. Our invention can be employed in processes for the high pressure and low pressure polymerization of ethylene, propylene and other olefinic hydrocarbons. The polymerization reaction must be carried out in a solvent medium, and by practicing our invention an efficient manner is provided for removing from the solvent medium impurities present in the fresh solvent feed and impurities that are produced during the polymerization reaction.

We prefer to employ in the polymerization reaction of our process an ionic type of catalyst that is effective for polymerizing the α-monoolefinic hydrocarbons in the presence of an inert hydrocarbon solvent. Any of the ionic types of catalyst systems can be employed in our process. Disclosures of ionic types of catalysts that can be used can be found in Belgian Patents 533,362, 534,792 and 538,-782. The ionic catalysts that can be employed in our process can contain two or more components, and one of the components of our catalyst system can be a transition metal compound, such as a halide, an alkoxide, an alkoxy halide, an acetylacetonate and the like of a transition metal, such as titanium, zirconium, chromium, molybdenum, vanadium, and the like. A second component of the ionic catalyst system employed in our process can be a metal or an organo-metal compound. Among the metals that can be used are aluminum, the alkali metals, the alkaline earth metals, and the like. Among the organo-metal compounds that can be employed in our catalyst system are the alkyl derivatives of the alkali metals and alkaline earth metals. Also, the alkyl and alkyl halide derivatives of aluminum are effective components in our catalyst compositions. Specific organo-metal compounds that can be employed are sodium amyl, lithium butyl, magnesium diamyl, zinc diethyl, aluminum triethyl, aluminum tributyl, diethyl aluminum chloride, ethyl aluminum sesquichloride, and the like. The second component of the catalyst system can also be a hydride of any of the above-named metals, such as lithium hydride, sodium hydride and the like, or a complex metal hydride, such as lithium aluminum hydride. In some instances in order to obtain the desired reaction a third component can be effectively employed in these catalyst compositions. Among the third components that can be used are the organo-phosphorus compounds, such as triethyl phosphine, tributyl phosphite, triethyl phosphate, hexamethyl phosphoric triamide, and the like. Other components of the catalyst systems that can be used are certain alkali metal halides, such as sodium fluoride and certain amines, arsines and stibines, such as tributylamine, triphenylarsine, triphenylstibine and the like. The components of our catalyst compositions can be employed in equimolar ratios and highly satisfactory results can be obtained by employing a three-component catalyst system, such as those described above, with each of the components being in equal molar amounts.

The polymerization reaction is usually carried out at a temperature within the range of 75° C. to 325° C. and preferably within the range of 130° C. to 260° C. The polymerization pressure can vary from atmospheric pressure up to 15,000 p.s.i.g. and higher. The reaction conditions for our polymerization reaction can be varied rather widely, and the specific conditions that are employed in the polymerization reaction are dependent to a large extent upon the physical properties of the polymer that is to be produced.

The organic vehicle or solvent employed can be an aliphatic alkane or cycloalkane such as pentane, hexane, heptane or cyclohexane, or a hydrogenated aromatic compound, such as tetrahydronaphthalene or decahydronaphthalene, or a high molecular weight liquid paraffin or mixture of paraffins which are liquid at reaction temperature, or an aromatic hydrocarbon, such as benzene, toluene, xylene. An odorless naphtha or mineral spirits solvent can be used in our process. The nature of the vehicle is subject to considerable variation, although the vehicle employed should be a liquid under the conditions of reaction and completely inert. The hydrocarbon liquids are desirably employed. Other solvents which can be used include ethyl benzene, isopropyl benzene, ethyl toluene, normal propyl benzene, diethyl benzenes, mono- and dialkyl naphthalenes, normal octane, isooctane, methyl cyclohexane, and any of the other well-known inert liquid hydrocarbons.

The polymerization ordinarily is accomplished by merely admixing the components of the polymerization mixture and heating to the desired polymerization temperature. This temperature is maintained by heating and cooling as required. When highly uniform polymers are desired employing the continuous process wherein the relative proportion of the various components are maintained substantially constant, temperature is the controlling factor as regards molecular weight and is desirably controlled within a relatively narrow range. This is readily accomplished since the solvent vehicle forms a high percentage of the polymerization mixture and has to be heated or cooled to maintain the temperature as desired.

The only limitation on the temperature at which the process can be effected is the decomposition temperature of the catalyst. In addition, temperature alone is used to control the melt index or molecular weight of the polymer. The pressure employed need only be sufficient to maintain the reaction mixture in liquid form during the polymerization, although moderate pressures are desirable for optimum yield and reaction rates. Since the catalyst employed can be readily dispersed in the organic solvent for the reaction, the uniformity of reaction can be readily controlled.

Polymerization embodying the invention can be carried out batch-wise or in a continuous flowing stream process. Continuous processes are preferred for economic reasons, and particularly good results are obtained using a continuous process wherein a polymerization mixture of constant composition is continuously and progressively introduced in the polymerization zone, and the mixture resulting from the polymerization is continuously and progressively withdrawn from the polymerization zone in amounts correlated and equivalent to the rate of introduction, whereby polymers of extremely uniform molecular weight distribution over a relatively narrow range are obtained. Such uniform polymers possess distinct advantages since they do not contain the low molecular weight or high molecular weight fractions which are ordinarily found in polyolefins prepared at low temperatures by batch processes. The ethylene or other alpha-monoolefin can be charged to the polymerization mixture either as a pure material or in admixture with other materials, such as hydrogen, and hydrocarbons, such as methane, ethane or propane. Ordinarily, relatively pure monomers are employed unless copolymers are desired. When the charged mixture consists of two or more olefins, the product consists of a true copolymer of the monomers rather than a mixture of homopolymers.

After the desired polymerization reaction has been carried out, the polymer that has been produced and the catalyst are separated from solvent in any suitable manner. In some instances, a filtration procedure can be employed for such separation. In other instances, it is desirable to use such procedures as centrifuging, decantation, and the like. It has been observed that solvent after separation from the polymer and catalyst contains substantial amounts of impurities and that upon repeated use in either a batch or a continuous process the solvent deteriorates. The extent of the deterioration is indicated by a lower yield of polymer upon re-use of the solvent in further polymerization reactions, and in order to maintain the rate of polymer production at a desirable level, it becomes necessary to increase the amount of catalyst and promoter charged to the polymerization reaction. It has also been observed that fractional distillation of the impure solvent does not provide sufficient purification to avoid the necessity for increased usage of catalyst charged to the polymerization reaction. It appears that solvent that has been employed in the polymerization reaction tends to accumulate impurities whose chemical structure has not been established. However, it is known that the accumulation of these impurities has an adverse effect upon the polymerization rate and upon the color and ash content of the polymer. Solvent deterioriation is greater when a highly branched aliphatic hydrocarbon solvent is employed because of the ease with which the tertiary carbon atoms of these solvents tend to undergo reaction. However, straight chain aliphatic hydrocarbon solvents, such as n-heptane and n-decane, also tend to undergo appreciable reaction to form impurities when used as solvent in an olefinic hydrocarbon polymerization reaction.

The preferred solvent purification procedure of our invention is actually a multi-step process. In the first step of our purification procedure the impurities in the solvent are reacted at the boiling point of the solvent with a lower alkoxide or hydroxide of an alkali metal, such as sodium. The ratio of hydroxide or alkoxide to solvent in the first step of our process can be varied over a relatively wide range depending upon the amount of impurities that are present in the solvent. Any of the alkali metal hydroxides and alkali metal alkoxides can be employed in our process, and we prefer to use the sodium compounds in our first purification step. Among the compounds that can be used are sodium methoxide, sodium ethoxide, sodium propoxide, sodium isopropoxide, sodium butoxide and sodium isobutoxide. Similar compounds of potassium and lithium can also be used. We prefer to employ sodium methoxide because of its availability and low cost. In the first step of our process, we usually employ from 0.4 to 5 pounds of hydroxide or alkoxide per 1,000 gallons of impure solvent, and we treat the solvent with the hydroxide or alkoxide at a refluxing temperature for a period of time within the range of 0.5 to 15 hours. After the desired reaction has taken place, solvent is distilled from refluxing mixture, and it appears that as a result of this treatment, the solvent impurities are in a form for effective removal from the solvent. It is essential that during the first treatment step of our purification process spent polymerization catalyst be absent from the solvent being treated. If spent catalyst is present during the first treatment step of our process, it tends to react with solvent to produce additional amounts of impurities which must be removed before the solvent is ready for use in a polymerization reaction.

In our purification process the distillate from which some impurities have already been removed in the first step of our process is passed into contact with a suitable adsorbent, such as silica gel, activated carbon, activated alumina and fuller's earth. We prefer to employ a silica gel in our percolation or adsorption step since much better results in the purification of our solvent are obtained with this type of adsorbent. The contact time that is required in the second step of our process depends upon a number of factors, such as the particle size of the adsorbent, the nature of the adsorbent, the purity of the initial solvent and the actual dimensions of the adsorbent bed. In many instances the desired purity of the solvent can be obtained using a space velocity of one volume of solvent per volume adsorbent per hour.

The solvent that has thus been purified can be returned to the polymerization reactor for further polymerization reactions without any substantial increase in the amount of catalyst that is needed to maintain the initial rate of polymerization. At regular intervals, regeneration of the adsorption column becomes necessary, and the required regeneration can be accomplished by blowing a hot inert gas through the column. During the regeneration, the temperature of the column is maintained at or above the boiling point of the solvent that has been purified in the column. The time of regeneration can ordinarily be decreased by adding steam to the inert gas being blown through the column. The regeneration of the silica gel bed employed in our process can readily be accomplished by blowing methane or other inert gas containing from 10–25% steam through the bed of silica gel at a temperature within the range of 150–250° C. when an odorless mineral spirits solvent had been purified in the silica gel bed.

As a result of the use of our purification procedure in an olefin polymerization process, it is possible to maintain the initial high rate of polymerization without any substantial increase in the amount of catalyst that is employed. It is also possible to prepare a polymer whose color meets commercial specifications and in our inven-

TABLE I

| Run | 1 | 2 | 3 | 4 | 5 |
|---|---|---|---|---|---|
| Catalyst: | | | | | |
| AlEt$_3$, grams | 10.0 | 10.0 | 10.0 | 10.0 | 10.0 |
| TiCl$_3$, grams | 13.5 | 13.5 | 13.5 | 13.5 | 13.5 |
| Solvent [1] | Heptane | Heptane | Heptane | Heptane | Heptane |
| Ml. charged | 1,000 | 1,000 | 1,000 | 1,000 | 1,000 |
| Polymerization conditions: | | | | | |
| Temperature, °C | 80 | 80 | 80 | 80 | 80 |
| Time, hours | 2.0 | 2.0 | 2.0 | 2.0 | 2.0 |
| Propylene pressure, p.s.i.g | 100 | 100 | 100 | 100 | 100 |
| Polypropylene yield, grams [2] | 250 | 335 | 292 | 208 | 540 |
| Polypropylene ash content, percent | 0.32 | 0.28 | 0.37 | 0.41 | 0.02 |
| Polypropylene color, TEC scale [3] | 3 | 3 | 3 | 4 | 1 |

[1] The purification of the solvent for each run was as follows:
  Run 1—Pure grade n-heptane, 99 mol. percent redistilled just prior to use.
  Run 2—Same as for Run 1, but percolated through 20–200 mesh silica gel just prior to use.
  Run 3—Same as for Run 1, but refluxed with 0.001 part of sodium methoxide for 5 hours prior to distillation.
  Run 4—Solvent recovered from Runs 1, 2 and 3 by filtering off polymer and redistilling the solvent.
  Run 5—Same as for Run 4, but refluxed 5 hours with 0.001 part of sodium methoxide, distilled, and distillate percolated through 20–200 mesh silica gel.
[2] Polymer was worked up by extracting five times with 2,000 ml. of isobutanol at 100–108° C.
[3] The TEC color scale for polypropylene is a series of standard color samples with 1 being the lightest and 4 the darkest.

tion we tend to decrease, and in fact, substantially eliminate color that ordinarily is imparted to the polymer as a result of impurities that accumulate in the solvent for the reaction.

The following examples are illustrative of our invention:

EXAMPLE 1

The beneficial effect of the solvent purification procedure of our invention in polymerization rate, yield, and polymer quality in propylene polymerization with an ionic catalyst is shown in the following series of runs. Each run was carried out in a 2-liter stirred autoclave. Reaction conditions and results are shown in the following table.

EXAMPLE 2

The use of the solvent purification procedure of this invention in solution polymerization of propylene in mineral spirits solvent is shown in the following runs. Mineral spirits is a highly-branched, completely aliphatic hydrocarbon boiling at 180–200° C. Runs were made in an 82-gallon stirred autoclave. The catalyst was removed by filtration of the reactor contents through a plate and frame filter press. Solvent was removed by stripping the polymer dope with dry propylene at 200° C. Solvent for Runs 1 and 2 was mineral spirits that had been used repeatedly for propylene polymerization with $LiAlH_4-TiCl_3$ catalyst and purified by distillation through a 10-plate column. Solvent for Runs 3 and 4 was of the same origin, but stirred with five pounds of sodium methoxide per 1000 gallons, distilled from the sodium methoxide through a 10-plate column and the distillate percolated through 100 pounds of 4–12 mesh silica gel contained in a 6-inch by 20-foot vertical pipe at a rate of 30–40 gallons per hour. Results were as follows:

TABLE II

| Run | 1 | 2 | 3 | 4 |
| --- | --- | --- | --- | --- |
| Solvent charged, pounds | 240 | 240 | 240 | 240 |
| LiAlH₄ charged, grams | 20 | 20 | 10 | 10 |
| TiCl₃ charged, grams | 80 | 80 | 40 | 40 |
| Reaction temperature, ° C | 150 | 150 | 150 | 150 |
| Reaction time, hours | 20 | 18 | 6 | 5 |
| Propylene pressure, p.s.i.g | 400 | 400 | 400 | 400 |
| Polypropylene produced, pounds | 105 | 120 | 90 | 115 |
| Ash content of product polymer, percent | 0.018 | 0.021 | 0.002 | 0.003 |
| Color of product polypropylene (TEC scale) | 1 | 2 | 1 | 1 |

The use of our invention makes possible the realization of important advantages over prior art polymerization procedures. In our process the use of solvent purified according to our invention enables the olefin polymerization reaction to be carried out at faster rates than with untreated solvent and it also makes possible the realization of higher ultimate yields of polymer per unit weight of catalyst. These factors are important in considering the size and cost of the polymerization reactors. Also, by practicing our invention it is possible to produce polymer having a color that is highly superior to polymer prepared in the presence of unpurified solvent. Impurities that are formed during the polymerization reaction are difficult to separate from the polymer and frequently the impurities remain in the polymer throughout the purification procedure. When the finished polymer is subsequently heated for extrusion or other purposes an objectionable yellow or brown color develops. Also, a tendency of the polymer to corrode metallic surfaces is frequently associated with the polymer color resulting from impurities.

Another advantageous property of polymer prepared in a process wherein our invention is employed is the low ash content of the polymer. Although we are not aware of the exact chemical nature of the impurities that accumulate in the solvent employed in our process, the impurities may consist of halide telomers, titanium telomers, or aluminum telomers. These impurities may leave a high ash content in the polymer, or they can decompose to form materials which are highly corrosive to metals that are in contact with the polymer. Also, a high ash content of the polymer may cause a high dissipation factor and dielectric constant which could render the polymer unsuitable for many applications which take advantage of the insulating properties of these polyolefins. Also, polymer having a high ash content may be subject to oxidation in an unusual degree.

Another outstanding advantage resulting from the practice of our invention is the low catalyst concentration that can be employed to obtain a high rate of polymerization, and as a result of the low catalyst concentration, the problem of removing catalyst from a polymer is greatly simplified. Among the methods of removing catalyst from polymer are filtration means, centrifuging and chemical reaction with an alcohol or other washing agent. Obviously, the methods of purifying the polymer are greatly simplified by the use of low catalyst concentrations during the polymerization reaction.

Polyethylenes of this invention are highly crystalline and usually exhibit crystallinity above 80 percent as shown by X-ray diagrams. Ordinarily, the crystallinity for the polyethylenes obtained by this process average above 90 percent. In contrast to the high pressure polyethylene known heretofore, the number of methyl groups per 100 carbon atoms in the polyethylenes of this invention are of the order of 0.5 or lower. The densities are of the order of 0.945 or higher, with densities of the order of 0.96 or higher being obtained in many cases. The inherent viscosities measured in tetralin at 145° C. may be varied from about 0.5 or lower to 5.0 or higher. Melt indicies as measured by the standard ASTM method may be varied from about 0.001 to 100 or even higher.

Thus, polyethylene prepared by means of this invention and having a molecular weight in the range of 50,000 exhibits density above 0.95, a softening temperature of at least 130° C., a tensile strength of 3000–5500 p.s.i. and a stiffness in flexure at 5 percent deflection, (ASTM Test D74–7–50) of at least 50,000 p.s.i.

The polyolefins prepared according to the invention can be molded or extruded into flexible plates or films. The products can be extruded in the form of pipe or tubing of greater rigidity than usual high pressure polyethylene or it can be injection molded into a great variety of articles. The polymers can also be cold drawn into ribbons, bands, fibers, or filaments of high elasticity and rigidity. Fibers of high strength can be spun from molten polyethylene or from molten polypropylene obtained according to this process. Polypropylene prepared in the same way also has a very high degree of crystallinity and a very high density, and the polymers of other alpha-olefins have similarly improved properties. The process of the invention can also be employed to effect the copolymerization of ethylene with other polymerizable α-monoolefins and particularly with propylene, 1-butene and 1-hexene. Other monoolefins which are suitably employed either alone or in admixture include such materials as butene-1, isobutylene, 1-pentene, 1-hexene, 1-decene, styrene and similar α-monoolefins. In some cases it is desirable to prepare copolymers of the α-monoolefins in order to modify the properties for particular uses such as in molding or extrusion applications. Thus, copolymers of 5–95 percent ethylene with 95–5 percent propylene are desirably prepared in many cases. A copolymer of ethylene with from 2–10 percent 1-hexene also has desirable properties.

Although the invention has been described in considerable detail with reference to certain preferred embodiments thereof, variations and modifications can be effected within the spirit and scope of this invention as described hereinabove and as defined in the appended claims.

We claim:

1. The process for polymerizing α-olefinic hydrocarbon to solid polymer which comprises polymerizing said hydrocarbon in a normally liquid hydrocarbon solvent using an ionic catalyst containing a transition metal compound and a component selected from the group consisting of metals in Groups I to III of the Periodic Table and organo-metal compounds and hydrides of Groups I to III metals, said catalyst producing impurities substantially soluble in said solvent during said polymerization, separating solvent containing impurities from polymer, distilling said solvent substantially free of polymer with a basic compound selected from the group consisting of hydroxides and lower alkoxides of alkali metals, passing resulting distillate into contact with a bed of silica gel particles and recycling thus-purified hydrocarbon solvent to said α-olefinic hydrocarbon polymerization step.

2. In the polymerization of α-olefinic hydrocarbon to solid polymer in a normally liquid hydrocarbon solvent using an ionic catalyst for the polymerization reaction containing a transition metal compound and a component selected from the group consisting of metals in Groups I to III of the Periodic Table and organo-metal compounds and hydrides of Groups I to III metals, said catalyst producing impurities substantially soluble in said solvent during the polymerization reaction, the improvement which comprises removing said impurities from said solvent substantially free of polymer by distilling said solvent with a basic compound selected from the group consisting of hydroxides and lower alkoxides of alkali metals and passing resulting distillate into contact with a bed of silica gel particles.

3. The process for polymerizing an α-olefinic hydrocarbon selected from the group consisting of ethylene and propylene to solid polymer which comprises polymerizing said α-olefinic hydrocarbon in a normally liquid aliphatic hydrocarbon solvent using an ionic catalyst containing a transition metal compound and a component selected from the group consisting of metals in Groups I to III of the Periodic Table and organo-metal compounds and hydrides of Groups I to III metals, said catalyst producing impurities substantially soluble in said solvent during said polymerization reaction, separating solvent containing said impurities from polymer, refluxing said solvent substantially free of polymer with a lower alkoxide of an alkali metal, distilling solvent from refluxing mixture, passing resulting distillate into contact with a bed of silica gel particles and recycling thus-purified hydrocarbon solvent to said α-olefinic hydrocarbon polymerization step.

4. The process for polymerizing propylene to solid polymer which comprises polymerizing said propylene in a normally liquid aliphatic hydrocarbon solvent, using an ionic catalyst containing a transition metal compound and a component selected from the group consisting of metals in Groups I to III of the Periodic Table and organo-metal compounds and hydrides of Groups I to III metals, said catalyst producing impurities substantially soluble in said solvent during said polymerization reaction, separating solvent containing said impurities from propylene, refluxing solvent substantially free of polymer with a lower alkoxide of an alkali metal, distilling solvent from refluxing mixture, passing resulting distillate into contact with a bed of silica gel particles and recycling thus-purified hydrocarbon solvent to said propylene polymerization step.

5. The process for polymerizing propylene to solid polymer which comprises polymerizing propylene in a normally liquid saturated aliphatic hydrocarbon solvent using an aluminum triethyl-titanium trichloride catalyst that produces impurities substantially soluble in said solvent during said polymerization reaction, separating solvent containing impurities from polypropylene, refluxing said solvent substantially free of polymer with sodium methoxide for a period of 0.5 to 15 hours, distilling solvent from refluxing mixture, passing resulting distillate into contact with a bed of silica gel particles and recycling thus-purified hydrocarbon solvent to said propylene polymerization step.

6. The process for polymerizing propylene to solid polymer which comprises polymerizing propylene in a normally liquid saturated aliphatic hydrocarbon solvent using a lithium aluminum hydride-titanium trichloride catalyst that produces impurities substantially soluble in said solvent during said polymerization reaction, separating solvent containing impurities from polypropylene, refluxing said solvent substantially free of polymer with sodium methoxide for a period of 0.5 to 15 hours, distilling solvent from refluxing mixture, passing resulting distillate into contact with a bed of silica gel particles and recycling thus-purified hydrocarbon solvent to said propylene polymerization step.

7. The process for polymerizing propylene to solid polymer which comprises polymerizing propylene in a normally liquid saturated aliphatic hydrocarbon solvent using an ethyl aluminum dichloride-titanium trichloride catalyst that produces impurities substantially soluble in said solvent during said polymerization reaction, separating solvent containing impurities from polypropylene, refluxing said solvent substantially free of polymer with sodium methoxide for a period of 0.5 to 15 hours, distilling solvent from refluxing mixture, passing resulting distillate into contact with a bed of silica gel particles and recycling thus-purified hydrocarbon solvent to said propylene polymerization step.

References Cited
UNITED STATES PATENTS

| | | | |
|---|---|---|---|
| 2,315,766 | 4/1943 | Border | 208—229 |
| 2,886,561 | 5/1959 | Reynolds et al. | 260—94.9 |
| 2,890,214 | 6/1959 | Brightbill et al. | 260—94.9 |
| 2,900,373 | 8/1959 | Martin | 260—94.9 |
| 2,913,447 | 11/1959 | Jacob et al. | 260—94.9 |
| 2,914,453 | 11/1959 | Wennerberg | 260—94.9 |

FOREIGN PATENTS

| | | |
|---|---|---|
| 567,511 | 12/1958 | Canada. |
| 815,310 | 6/1959 | Great Britain. |

OTHER REFERENCES

Chemical Engineers' Handbook (Perry) published by McGraw-Hill, third ed., 1950 (pp. 888 relied on).

JOSEPH L. SCHOFER, *Primary Examiner.*

M. LIEBMAN, L. H. GASTON, LEON J. BERCOVITZ, WILLIAM H. SHORT, *Examiners.*

A. S. COOKFAIR, W. J. VAN BALEN, F. M. SIKORA, E. M. OLSTEIN, M. B. KURTZMAN,
*Assistant Examiners.*